United States Patent Office 3,415,749
Patented Dec. 10, 1968

3,415,749
ARYLENEDIOXYTIN COMPOUNDS AND OXIDATION INHIBITED COMPOSITIONS CONTAINING SAME
Robert F. Bridger, Hopewell Township, N.J., assignor to Mobil Oil Corporation, a corporation of New York
No Drawing. Filed Aug. 2, 1966, Ser. No. 569,568
8 Claims. (Cl. 252—42.7)

ABSTRACT OF THE DISCLOSURE

Organic materials normally degradable by oxidation are stabilized with arylenedioxytin compounds. Novel arylenedioxytin compounds and a process for preparing the same are provided.

This invention relates to the stabilization of organic materials normally degradable by oxidation, novel chemical compounds useful for inhibiting said organic materials against oxidation, and a process for preparation of such compounds. More particularly, this invention relates to novel tin-containing compounds, to a process for their preparation, and to organic compositions, inhibited against oxidation by such compounds. Still more particularly, the invention embodied herein relates to stabilization, against oxidative degradation, of organic materials such as mineral oil lubricants and fuels, synthetic lubricants for high temperature applications, and polymers such as those, for example, which are derived from olefinic hydrocarbons.

As is known to those skilled in the art, oxidation of polymers, lubricants, and fuels may occur under a variety of conditions, leading to many undesirable effects. Thus, in the case of automotive lubricants, for example, oxidation can yield acidic products which lead to corrosion of metal surfaces. Furthermore, in an automobile engine, oxidation of the lubricant can be especially harmful if the oxidized lubricant does not disperse the sludge readily, thus permitting the impurities to settle or become deposited therein. This leads to a serious lessening of efficient work by the engine.

Thus, in the case of commercial lubricants, as well as fuels and polymers, they are normally blended with agents having antioxidant properties to prevent their deterioration. For many purposes antioxidants should maintain their stability at high temperatures for prolonged periods of time. However, at elevated temperatures (e.g., 260–350° C.) many of the conventional stabilizing antioxidants are ineffective over extended periods, and sometimes will actually promote deterioration in the presence of oxygen.

It is, therefore, one object of this invention to provide novel additives and organic compositions containing them which are protected thereby against oxidative deterioration. A further object is to provide antioxidants and antioxidant compositions which are stable over extended periods of time at high temperatures. A still further object is to provide a new and novel process for producing the antioxidant compounds of this invention.

In accordance with this invention, it has been discovered that inhibition against oxidative degradation of organic materials can be attained by adding to the organic composition to be stabilized a minor amount by weight, sufficient to provide inhibition against oxidation of an arylenedioxytin compound of the formula

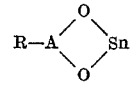

wherein A is the arylene nucleus of a dihydric phenol containing up to four aromatic rings, and R is a ring substituent selected from the group consisting of hydrogen, aliphatic radicals containing up to 12 carbon atoms, haloaliphatic radicals containing up to 12 carbon atoms, and halogen.

In generic aspect, the novel tin-containing compounds embodied herein may be prepared by reacting the dialkali metal, (e.g. disodium) salt of a polyhydric phenol and stannous chloride, substantially as follows; with use of the sodium salt as an example

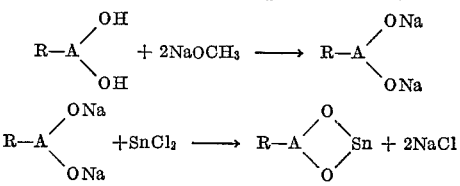

wherein R and A are defined as above. Such a method using the preformed salt is a marked improvement over the method of Emeleus and Zuckerman, J. Organometal. Chem., 1, p. 328 (1964), who teach a method of preparing arylenedioxytin (II) compounds by reacting a dihydric phenol with a slurry of stannous chloride and sodamide powders in ether for from 30 to 72 hours. Such a method, involving sodamide and stannous chloride in ether requires a time which is not feasible from a commercial standpoint. Furthermore, sodamide is an effective reducing agent which can lower the yield of desired product by reacting therewith. Moreover, strictly anhydrous conditions are required in the sodamide method, the yield of product being reduced drastically when such conditions are not present.

In accordance with the invention, it has been found that, by reacting the preformed dialkali metal salt of a dihydric phenol with stannous chloride, good yields are obtained, the time to produce the product is greatly reduced, and the by-product (e.g., sodium chloride) does not interfere with the final product.

The intermediate salt (e.g., disodium salt), of dihydric phenols can be prepared by any convenient method. One satisfactory method involves, as the above reactions indicate, the reaction of sodium methoxide with the dihydric phenol in an inert organic solvent. In this method substantially one equivalent of dihydric phenol and substantially two equivalents of sodium methoxide are added to benzene in a suitable reaction vessel, and benzene and methanol are codistilled under a stream of nitrogen until the dry disodium salt is obtained.

Equivalent quantities of the disodium salt and anhydrous stannous chloride in a solvent, such as ether, are stirred under reflux until the reaction is complete. The product is usually a solid, and may be separated from the liquid phase by filtration. The product thus obtained is generally pure enough for use as an antioxidant, but if purer materials are necessary, further purification may be effected by sublimation, selective solvent extraction, where applicable, and the like.

Having discussed the process in broad terms, the following specific, non-limiting embodiments are offered as further illustrations of the method. Parts are by weight.

EXAMPLE 1

Preparation of 2,2-biphenylene dioxytin

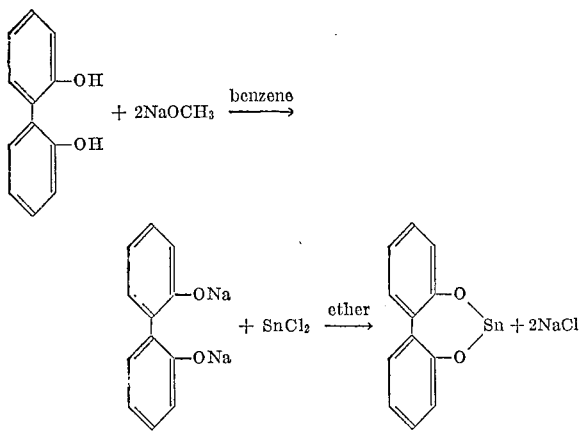

(a) *Preparation of the disodium salt.*—Into a suitable flask equipped with a nitrogen inlet, stirrer, and Dean-Stark trap with condenser were placed 2.16 parts of sodium methoxide, 3.72 parts of 2,2'-biphenol, and 88 parts of benzene. Benzene and methanol were codistilled under a stream of nitrogen until the dry disodium salt of 2,2'-biphenol was obtained.

(b) *Preparation of the compound.*—Without removing the dry salt from the reaction vessel, 71.0 parts of diethyl ether and 3.79 parts of dry, finely pulverized stannous chloride were added, and the mixture was stirred at reflux (35° C.) under nitrogen for 19 hours. The crude solid product was separated by filtration and placed in an extraction thimble, and substantially complete removal of unreacted stannous chloride was effected by extraction with diethyl ether. 6.92 parts of crude product having a purity of 44.3% was obtained, giving an overall yield of 51% of the theoretical. The product had the following properties:

Sublimation: 340° C. at 0.1 mm. of Hg: (Calcd.) C, 47.58%; H, 2.66%. (Found) C, 46.08%; H, 2.84%.

EXAMPLE 2

Preparation of 2,3-naphthalenedioxytin

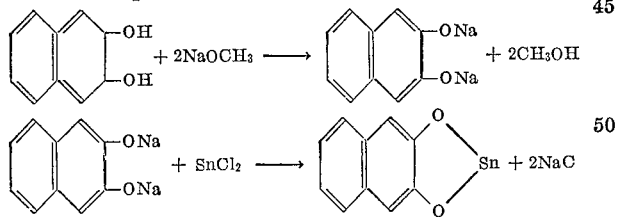

The disodium salt was prepared as in Example 1 from 3.20 parts of 2,3-naphthalenediol and 2.16 parts of sodium methoxide. The disodium salt was reacted with 3.79 parts of stannous chloride in 71 parts of diethyl ether at reflux (35° C.) for 16 hours, and was then worked-up as in Example 1. The total yield was 70% of the theoretical. The product had the following properties:

Melting point >300° C. (Calcd.) C, 42.90%; H, 2.16%. (Found) C, 42.73%; H, 2.16%.

EXAMPLE 3

Preparation of 2,2'-(1,1'-dinaphthyl)enedioxytin

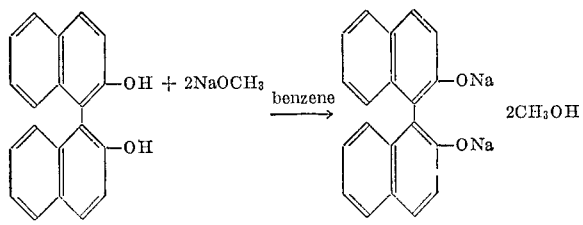

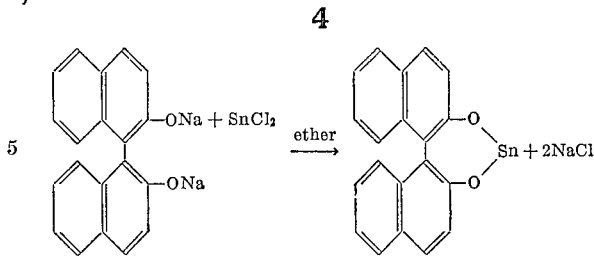

The disodium salt was prepared as in Example 1 from 5.73 parts 2,2'-dihydroxy-1,1'-dinaphthol and 2.16 parts of sodium methoxide. The disodium salt was reacted with 3.79 parts of stannous chloride in 71.0 parts of diethyl ether at reflux (35° C.) for 17 hours, and was then worked-up in a manner similar to that shown in Example 1. The product had the following properties:

Melting point >340° C. (Calcd.) C, 59.60%; H, 3.00%. (Found) C, 58.09%; H, 3.19%.

To further illustrate the invention, the following are examples of additional compounds which may be prepared by the process of this invention and which are useful as antioxidants. It will be understood that they are intended merely to show the scope of the process, not to impose any limitations upon it.

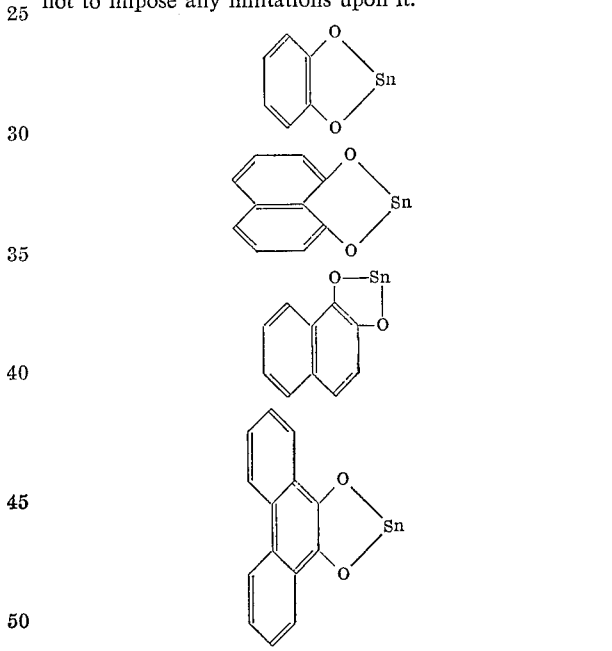

In the above specific embodiments, the use of equimolar quantities of stannous chloride and the disodium salt of dihydric phenol has been disclosed. However, since neither reactant is completely soluble in the solvent used, the reaction apparently does not depend upon a concentration effect. Thus, the concentration is not critical, and it is unnecessary to mix the reactants in any particular proportions with regard to rate of reaction. That is to say, either may be in excess. It may be that the reactants form an equilibrium between dissolved and undissolved masses, with further dissolution as the product is formed.

For complete reaction without the necessity for continuously adding one of the materials, however, it is desirable to have equimolar quantities of reactants in the reaction zone at the outset. Furthermore, the use of equimolar quantities eliminates the necessity for removal of comparatively large amounts of unreacted reagents from the final product.

The solvent used in the preparation of the novel compounds is an important factor. In general, it has been found that the reaction to form the final product does not proceed in non-polar solvents such as benzene. In order to be effective, the solvent should dissolve an appreciable fraction of the stannous chloride reactant, and at the same time should not neutralize the sodium salt of the dihydric phenol.

While only diethyl ether has been disclosed in the examples, other polar aliphatic ethers may be used. Examples of such other ethers which may be used are tetrahydrofuran and bis(2-methylethyl) ether. Others will be readily apparent to those skilled in this art.

Under the conditions of the reactions shown in Examples 1 to 3, the maximum temperature obtainable during the formation of the product was 35° C. The process, however, is not to be limited to this temperature. It is contemplated that temperatures within the range of from about 0° C. to about 120° C. will be suitable. Reaction temperatures, particularly those in the upper portion of the stated range, can be conveniently controlled by choosing a solvent boiling at or near the desired temperature.

Although it is contemplated that temperatures as low as 0° C. will be suitable, consideration must be given to the fact that, in some systems at least, the rate of reaction may be unduly long from a commercial point of view at or near that temperature. Moreover, although temperatures up to about 120° C. are preferable, as a practical matter temperatures to just below the decomposition point of the particular salt utilized may be used.

As the dialkali metal salts of dihydric phenols are subject to atmospheric oxidation, the reactants should be blanketed with an inert gas to avoid such oxidation. Other inert gases (other than nitrogen, which was used in the specific examples) which one will find useful in the practice of this invention are helium and argon, and in general, any other gas which is inert to the reactants and to the final product.

In Examples 1 to 3, the times of reaction shown do not necessarily indicate the actual time it takes to complete the reaction. Additional runs, such as for the production of the product of Example 2, resulted in reaction of about 90% of the stannous chloride in about four hours, and, at 16 hours, substantially all of the stannous chloride had been consumed. Thus, and generally speaking, for this particular compound, therefore, substantially complete reaction is effected by carrying out the process embodied herein for more than four hours and, preferably, for from more than four hours up to twenty hours, or less.

The prior art discloses that tin(II) additives have been tried as antioxidants in the organic systems already referred to. For example, diphenyltin,

and di(9-phenanthryl) tin,

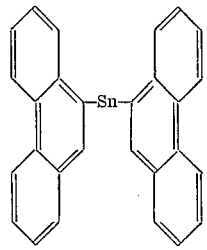

have been used in lubricant systems, but without success. These compounds are polymeric, and are known to oxidize rapidly in the presence of air to the diaryltin oxides, thusly:

$$Ar_2Sn + \tfrac{1}{2}O_2 \rightarrow Ar_2SnO$$

It is surprising, therefore, that the compounds of this invention inhibit organic materials such as polymers, fuels, and lubricants under oxidative conditions.

The quantity of the arylenedioxytin compounds which may be used for inhibiting oxidation of the organic materials is generally in the range of about 0.001% to about 10% by weight of the total composition. More specifically, suitable results may be obtained by use thereof in the range of from about 0.1% to about 1.0% by weight for lubricants and fuels, and of from about 0.1% to about 5% by weight for polymers.

As used herein, the term "fuels" and "lubricants" are intended to include mineral oils, hydrocarbon fuel fractions, polyolefins, dicarboxylic esters, trimethylol esters, pentaerythritol esters, polyalkylene oxides, phosphorus acid esters, polyphenyl esters, and the like. The term "polymers" is meant to include polyurethanes, phenol-aldehyde resins, natural and synthetic rubbers such as GR-S rubber, silicone polymers, and similar types. The compositions may, therefore, have utility not only as lubricants and fuels for automotive engines, but also as gear oils, turbine oils, aviation lubricants, transmission oils, hydraulic fluids, and marine oils. Moreover, these formulations may also be combined with suitable thickeners, such as polyaromatic dye compounds or clays, to form oxidation-inhibited greases.

The following tests are for the purposes of illustrating the utility of the arylenedioxytin compounds disclosed herein, and are not to be construed in any way as limitations on the inventive concept.

Test method

The arylenedioxytin compound and base oil, which is an isomeric mixture of bis(phenoxyphenoxy) benzene of the formula

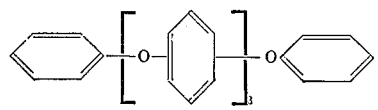

in which the linkages are predominately meta, are placed in a 28 x 260 mm. tube. A total of 15 gms. of additive and oil are used. The tube is positioned in a heater and allowed to equilibrate thermally to a test temperature of 310° C. Oxygen is introduced to the sample at a rate of 5 liters per hour through a fritted glass disk positioned about 3 mm. from the bottom of the tube. The rate of oxygen absorption is recorded automatically. The inhibition period $t_{1.0}$ is taken as the time in hours required for the absorption of 1.0 mole of oxygen per kg. of oil. The inhibition period is directly proportional to the oxidative stability of the oil in the presence of the antioxidant.

Results obtained by using dispersions of the antioxidants in the test oil are shown in the following table:

| Additive<br>0.003 mole/kg. of oil | $t_{1.0}$ |
|---|---|
| None | 11 |
|  | 36 |
| 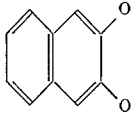 | 33 |
| 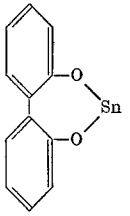 | 117 |

| Additive 0.003 mole/kg. of oil | $t_{1.0}$ |
|---|---|
| 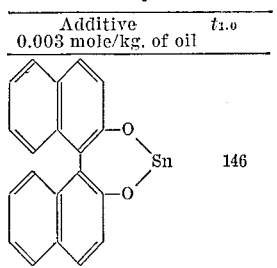 | 146 |

In practicing the invention on an enlarged scale, particularly with respect to fuels and lubricants, several methods for adding antioxidant are feasible. As an example, since only small quantities of the additive are required, fuels and lubricants may have stabilizing quantities of antioxidants added thereto by passing them, while hot, through a bed of the crude arylenedioxytin. Additionally, the antioxidants of this invention may be used as dispersions or solutions in the medium to be inhibited. Dispersions may be necessary when used with non-polar substances, since arylenedioxytin (II) compounds have a low solubility in such materials. This low solubility is probably due to their polymeric nature resulting from intermolecular tin-oxygen bonds. Thus, the range of effective concentrations stated for said antioxidants for lubricants, fuels, and polymers include those concentrations within the solubility range, as well as concentrations which include a major proportion of dispersed antioxidant.

The overall range stated (0.001% to 10%) is intended to be inclusive of the amounts which can be employed in a given system without any detrimental effects. It must be pointed out, however, that for certain systems there is a critical concentration at which the maximum effect is attained, and that beyond this concentration a negative response of inhibition begins to appear. Apparently, this is a general phenomenon for tin additives. To illustrate this, several concentrations of 2,2′-biphenylenedioxytin were tested as an antioxidant for polyphenyl ether as described in the above method. The results are shown in the table which follows.

| Concentration of 2,2′-biphenylene-dioxytin, mole kg.-1: | $t_{1.0}$ |
|---|---|
| None | 11 |
| 0.003 | 117 |
| 0.020 | 62 |
| 0.033 | 29 |

I claim:
1. A composition capable of withstanding oxidation at high temperatures comprising a major proportion of an organic material normally degradable by oxidation selected from the group consisting of mineral oil lubricants and fuels, synthetic lubricants, hydrocarbon polymers, polyurethanes, phenolaldehyde resins, natural and synthetic rubbers, silicone polymers, and greases, and a minor proportion, sufficient to provide antioxidant properties thereto, of an arylenedioxytin compound selected from the group consisting of

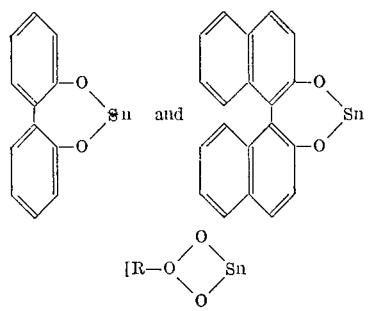

wherein A is the arylene nucleus of a dihydric phenol containing up to four aromatic rings, and R is a ring substituent selected from the group consisting of hydrogen, aliphatic radicals, haloaliphatic radicals, and halogen, said aliphatic and haloaliphatic containing up to 12 carbon atoms].

2. The composition of claim 1 in which the arylenedioxytin is

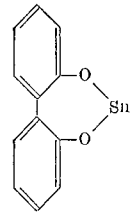

3. The composition of claim 1 in which the arylenedioxytin is

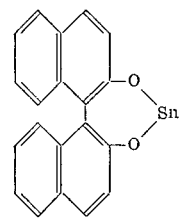

4. The composition of claim 1 wherein the arylenedioxytin is employed within the range of about 0.001% to about 10%.

5. The composition of claim 1 wherein the major proportion is a lubricant and the arylenedioxytin is employed within the range of from about 0.001% to about 1.0%.

6. The composition of claim 1 wherein the major proportion is a fuel and the arylenedioxytin is employed within the range of from about 0.001% to about 1.0%.

7. The composition of claim 1 wherein the said organic material is a polyphenyl ether and the said arylenedioxytin is

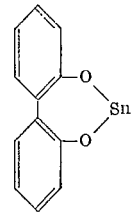

8. The composition of claim 1 wherein the said organic material is a polyphenyl ether and the said arylenedioxytin is

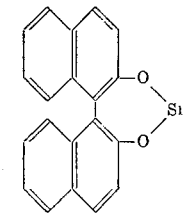

References Cited
UNITED STATES PATENTS

| 2,514,199 | 7/1950 | Smith | 260—429.7 |
| 3,114,713 | 12/1963 | Coffield | 252—48.2 |
| 3,290,247 | 12/1966 | Wilson et al. | 252—42.7 |
| 3,328,300 | 6/1967 | Young | 252—52 |

DANIEL E. WYMAN, *Primary Examiner.*

W. H. CANNON, *Assistant Examiner.*

U.S. Cl. X.R.

252—26, 400; 44—68; 260—45.75, 448.2, 81

UNITED STATES PATENT OFFICE
CERTIFICATE OF CORRECTION

Patent No. 3,415,749            December 10, 1968

Robert F. Bridger

It is certified that error appears in the above identified patent and that said Letters Patent are hereby corrected as shown below:

Column 3, lines 50 to 54, the portion of the formula reading "2NaC" should read -- 2NaCl --. Column 7, lines 70 to 73, the formula should appear as shown below:

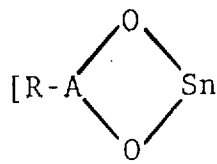

Signed and sealed this 17th day of March 1970.

(SEAL)
Attest:

EDWARD M. FLETCHER, JR.            WILLIAM E. SCHUYLER, JR.
Attesting Officer                     Commissioner of Patents